United States Patent [19]

Towata et al.

[11] Patent Number: 5,145,719
[45] Date of Patent: Sep. 8, 1992

[54] METHOD FOR COATING SURFACE OF FINE PARTICLES WITH A LAYER OF FINE METAL OXIDE POWDER

[75] Inventors: Atsuya Towata, Nagoya; Mutsuo Sando, Narukomachi, both of Japan

[73] Assignees: Agency of Industrial Science & Technology; Ministry of International Trade & Industry, both of Tokyo, Japan

[21] Appl. No.: 673,409

[22] Filed: Mar. 22, 1991

[30] Foreign Application Priority Data

Jun. 13, 1990 [JP] Japan ................................. 2-154341

[51] Int. Cl.$^5$ .............................................. B05D 7/24
[52] U.S. Cl. .................................. 427/215; 427/419.2; 428/403
[58] Field of Search ............ 427/180, 190, 215, 376.2, 427/419.2, 419.8; 428/403, 404; 419/35, 36; 106/287.16, 287.19, 287.26

[56] References Cited

U.S. PATENT DOCUMENTS

| | | | |
|---|---|---|---|
| 4,713,233 | 12/1987 | Marsh et al. | 502/351 |
| 5,011,725 | 4/1991 | Foster | 428/403 |

FOREIGN PATENT DOCUMENTS

| | | | |
|---|---|---|---|
| 59-25901 | 2/1984 | Japan | 427/215 |

OTHER PUBLICATIONS

Progress of Chemical Industry 23 Molecule Chemical Industry Chapter 7, pp. 106–113, S. Hirano, et al. (undated).

Journal of Color Material Society, vol. 55, 1982, pp. 657–666, Y. Kawashima.

Abstracts of Papers Read at Granule Formulation and Design Symposium, pp. 67–70, F. Yokoyama, et al. (undated).

*Primary Examiner*—Shrive Beck
*Assistant Examiner*—Terry J. Owens
*Attorney, Agent, or Firm*—Oblon, Spivak, McClelland, Maier & Neustadt

[57] ABSTRACT

Minute particles having the surface thereof coated with a dense layer of extremely fine particles of a metal oxide are produced by dispersing the fine particles having water adsorbed in advance on the surface thereof in a hydrophobic organic solvent having an alcohol and optionally an amine dissolved therein and adding to the resultant dispersion a hydrophobic organic solvent having a metal alkoxide dissolved therein, thereby inducing hydrolysis of the metal alkoxide on the surface of the fine particles and consequent deposition of a metal oxide on the surface of the fine particles.

12 Claims, No Drawings

METHOD FOR COATING SURFACE OF FINE PARTICLES WITH A LAYER OF FINE METAL OXIDE POWDER

BACKGROUND OF THE INVENTION

1. Field of the Invention

This invention relates to a method for coating the surface of fine particles closely with a layer of fine metal oxide powder several nanometers in thickness. More particularly, this invention relates to a method for coating the surface of fine particles by causing fine particles having water adsorbed in advance on the surface thereof to contact a metal alkoxide thereby hydrolyzing the metal alkoxide and consequently covering the particles with the hydrolysate.

The method of this invention has utility in such applications as production of a sintering auxiliary.

2. Description of the Prior Art

As methods heretofore commonly employed for the production of granules coated with a layer of fine metal oxide powder several nanometers in thickness, there can be mentioned a method which comprises mutual adsorption between particles of a microfine powder not more than approximately 10 nm in diameter and granules approximately 1 μm in diameter through the medium of a surfactant by controlling the pH value and adjusting the zeta ($\zeta$) potential [S. Hirano, Design of Complex Material II Organic Complex Material, (Progress of Chemical Industry 23 Molecule Chemical Industry Chapter 7) edited by Chemical Engineering Society], a method which comprises thoroughly mixing a microfine powder and granules in a liquid and spray drying the resultant mixture [Y. Kawashima, Journal of Color Material Society, Vol. 55(9), p 657 (1982)], and a method which comprises subjecting a microfine powder and granules to mutual friction in dry air thereby attaining mutual adhesion therebetween by virtue of static electric force [F. Yokoyama et al, Abstracts of Papers Read at Granule Formulation and Design Symposium p 67 (1986)]. In case of these conventional methods, the success of the deposition of a microfine powder on granules is at the mercy of probability and control of layer thickness requires considerable know-how. In the products of these methods, the coating layer is a coarse film formed by mere cohesion of the particles of microfine powder and the percentage of the microfine powder which escapes cohesion is large. The methods further have a disadvantage that they are not capable of easily producing a submicron order coat of high economic value.

In the circumstances, it is necessary to develop a method capable of coating fine particles with a dense layer of microfine powder without entailing any of the drawbacks mentioned above.

To this end, the present inventors earlier proposed a method for forming a dense layer of a metal oxide on fine particles by causing fine particles having water adsorbed in advance on their surface to react with a metal alkoxide incorporating a small amount of a higher fatty acid therein (U.S. application Ser. No. 07/496,060). With this method, however, there is the possibility that part of the metal oxide formed during the hydrolysis will peel off, depending on the conditions for the formation of the coated fine particles.

SUMMARY OF THE INVENTION

The present inventors continued a study with a view to establishing a better method of coating the surface of fine particles. They consequently found that the object of coating the surface of fine particles with a layer of controlled thickness is attained by causing an alcohol and optionally an amine to be present at the time of local hydrolysis of an organic alkoxide on the surface of the fine particles during the formation of the layer of the metal oxide on the surface of the fine particles. The present invention was accomplished on the basis of this finding.

To be specific, this invention is directed to a method for coating fine particles comprising the steps of dispersing fine particles having water adsorbed in advance on the surface thereof in (a) a hydrophobic organic solvent incorporating therein 2.5 to 10% by weight of an alcohol of 2 to 4 carbon atoms and optionally 0.005 to 0.05 mol of an amine per liter of a solvent and adding to the resultant dispersion of the fine particles (b) a hydrophobic organic solvent having a metal alkoxide dissolved therein thereby forming on the surface of the fine particles a dense layer of extremely fine particles of a metal oxide formed in consequence of the ensuing hydrolysis of the metal alkoxide.

DETAILED DESCRIPTION OF THE PREFERRED EMBODIMENT

In causing adsorption of water on the fine particles, which may for example be alumina or zinc oxide particles of a BET specific area of from 5 to 15 $m^2$, it suffices to adjust the relative humidity and adsorption time so as to regulate the amount of water adsorbed on the particle surfaces to a desired level in the range of 0.1 to 30 mg per m2 of surface area. Since the amount of water to be adsorbed determines the thickness of the produced coating layer, the water is adsorbed in the amount necessary for producing the metal oxide coating on the surface of the fine particles by the hydrolysis of a metal alkoxide. The fine particles used in the present invention should not be limited to those of alumina and zinc oxide. The hydrophobic organic solvents suitable for use in this invention include such aromatic hydrocarbons as benzene, toluene, and xylene and such petroleum fractions as kerosene, hexane and ligroin, for example. The alcohol for addition to the solvent has two to four carbon atoms. Alcohols which answer this description are ethanol, i-propanol, n-propanol, and n-butanol, for example. The amount of such an alcohol used is in the range of 2.5 to 10% based on the amount of the hydrophobic organic solvent.

The metal alkoxide used as a raw material for the coating layer for the fine particles is not specifically defined and there can be used both alkoxides possessing low reactivity and alkoxides possessing high reactivity. The alkoxides of the former type include silicon methoxide and silicon ethoxide and those of the latter type include titanium ethoxide, titanium isopropoxide, titanium butoxide, and zirconium propoxide, for example. The amount of such an alkoxide to be used is in the range of 5 to 20% by weight in the case of a species of low reactivity and in the range of 0.5 to 10% by weight in the case of a species of high reactivity.

For an alkoxide of low reactivity to be used advantageously, it should desirably incorporate an amine therein. Amines effectively usable for this purpose include i-propyl amine, n-hexyl amine, didodecyl amine, and tri-n-octyl amine, for example. The amount of such an amine to be used is selected in the range of 0.005 to 0.05 mol/l.

The method of this invention is conducted by vigorously stirring the aforementioned alcohol-diluted organic solution by ultrasonic waves or with a stirrer, adding the fine particles in a hydrated form to the stirred organic solution, and further adding thereto the hydrophobic organic solvent having the metal alkoxide dissolved therein, thereby inducing hydrolysis on the surface of the fine particles. The ratio of the amount of the alcohol-added hydrophobic organic solvent to the amount of the metal alkoxide-dissolved hydrophobic organic solvent is desired to be in the range of 20:1 to 1:1.

The reaction time is in the range of several hours to some tens of hours where the alkoxide to be used possesses low reactivity and in the range of several minutes to several hours where the alkoxide possesses high reactivity. The amount of the hydrated fine particles to be added to the hydrophobic organic solvent is desired to be not more than 100 g per liter of the organic solvent.

The amount of the metal alkoxide contained in the hydrophobic organic solvent is desired to be one to several times the amount stoichiometrically expected to be locally hydrolyzed thoroughly by the water adsorbed on the fine particles where the alkoxide possesses high reactivity and some tens to some hundreds times the amount mentioned above where the alkoxide possesses low reactivity. After the water adsorbed on the surface of the fine particles has been consumed by the hydrolysis of the metal alkoxide and the coating of the fine particles with the metal oxide has been consequently completed, the fine particles are separated from the organic solvent containing the unaltered metal alkoxide by centrifugal separation and the separated fine particles are washed several times with an organic solvent to be deprived of the unaltered alkoxide. After the washing is completed, the fine particles are dispersed in a solvent such as methyl alcohol which has low surface tension. The resultant dispersion is placed in a vacuum drier, for example, subjected first to gradual vaporization of the solvent at a low temperature, and further subjected to vacuum drying at a temperature near 200° C. When the dry fine particles consequently obtained still have any organic substance deposited thereon, they are heated in the open air at temperatures in the range of 300° C. to 400 ° C. to effect oxidative decomposition of the organic substance. Consequently, there is obtained a coating of high purity in a controlled thickness. The thickness of this coating can be controlled in the range of from 1 to 20 nm.

This invention concerns a method for coating fine particles by forming a uniform and dense layer of extremely fine particles on the surface of the fine particles without entailing the drawbacks of the prior art. The fact that this method enables free control of the coating thickness is highly advantageous from the industrial point of view.

This invention will now be described with reference to working examples.

EXAMPLE 1

About 100 ml of hexane was mixed with 10 vol % of isopropyl alcohol. In the resultant mixture, 3 g of high-purity alumina possessing a BET specific surface area of 13.6 $m^2/g$ and having adsorbed thereon 11 mg of water per $m^2$ was placed and dispersed by ultrasonic waves. To the resultant dispersion, 20 ml of an organic solvent (hexane) having 1.2 ml of titanium isopropoxide dissolved therein was added dropwise. The resultant mixture was stirred at the rate of 240 rpm with a stirrer and, at the same time, maintained at 25° C. for five hours to effect reaction. Subsequently, the reaction product was subjected to an ultrasonic treatment to effect dispersion of particles. The dispersed particles were washed three times with hexane and three more times with methanol, dried at room temperature, and further heat-treated at 450° C. As a result, there were obtained fine alumina particles coated with titania.

These fine particles, by observation under an analytic electron microscope, by chemical analysis, and by determination of specific surface area, were identified to be alumina particles coated uniformly with extremely fine titania particles. The results of the analysis are shown in the table given hereinbelow.

EXAMPLES 2 TO 4

Alumina particles coated with titania were obtained by following the procedure of Example 1, except that alumina powder having adsorbed thereon different amounts of water per unit surface area as indicated in the table was used instead. The results of the analysis are shown in the table.

| Example | Sample | Amount of titania (%) in coating layer | Specific surface area ($m^2/g$) | Thickness of coating |
|---|---|---|---|---|
| 1 | 11 mg of water adsorbed per $m^2$ | 7.45 | 29.4 | 4 |
| 2 | 22 mg of water adsorbed per $m^2$ | 15.8 | 35.2 | 8 |
| 3 | 5.5 mg of water adsorbed per $m^2$ | 2.58 | 25.2 | 1 |
| 4 | 16.5 mg of water adsorbed per $m^2$ | 11.23 | 33.8 | 6 |

EXAMPLE 5

A powder was obtained by following the procedure of Example 1, except that ligroin was used in place of hexane. The powder, by observation under an analytical electron microscope, was identified to be an alumina powder coated uniformly with extremely fine particles of titania.

EXAMPLE 6

A powder was obtained by following the procedure of Example 1, except that 10 vol % of ethanol was used in place of 10 vol % of isopropyl alcohol. The powder, by observation under an analytical electron microscope, was identified to be an alumina powder uniformly coated with extremely fine titania particles.

EXAMPLE 7

A powder was obtained by following the procedure of Example 1, except that zinc oxide powder was used in place of alumina powder. The powder, by observation under an analytical electron microscope, was identified to be zinc oxide powder coated uniformly with extremely fine titania particles.

EXAMPLE 8

In an organic solvent prepared by dissolving 0.01 mol of isopropyl amine per liter and 10 vol % of isopropanol in about 100 ml of hexane, 3 g of alumina possessing a specific surface area of 13.6 m²/g and having adsorbed thereon 11 mg of water per unit surface area was placed and dispersed by ultrasonic waves. The resultant mixture and 40 ml of hexane dissolved therein 14 ml of silicon ethoxide added thereto were stirred with a stirrer and, at the same time, maintained at 25° C. for 48 hours to effect reaction. The reaction product was washed three times with hexane and three times with methyl alcohol, dried at room temperature, and thereafter heat-treated at 450° C., to obtain alumina powder coated with silica. This powder, by observation under an analytical electron microscope, was identified to be an alumina powder coated uniformly with extremely fine silica particles.

EXAMPLE 9

A powder was obtained by following the procedure of Example 1, except that tin ethoxide was used in the place of titanium isopropoxide. The powder, by observation under an analytical electron microscope, was identified to be alumina powder coated uniformly with extremely fine tin oxide particles.

COMPARATIVE EXPERIMENT

A powder was obtained by following the procedure of Example 1, except that the addition of 10 vol % of isopropyl alcohol was omitted. The powder, by observation under an analytical electron microscope, was found to comprise an aggregate of extremely fine titania particles existing separately from alumina powder and alumina powder not uniformly coated with any extremely fine particles.

What is claimed is:

1. A method for coating fine particles, which comprises:
   dispersing fine particles having water absorbed in advance on the surface thereof in a first hydrophobic organic solvent (a) which incorporates therein 2.5–10% by weight of an alcohol of 2–4 carbon atoms; and
   adding to the resultant dispersion of said fine particles a second hydrophobic organic solvent (b) having a metal alkoxide dissolved therein thereby forming on the surface of said fine particles a dense layer of extremely fine particles of a metal oxide as the metal alkoxide is hydrolyzed by the surface water on the fine particles.

2. The method according to claim 1, wherein said hydrophobic organic solvents (a) and (b) are one member selected from the group consisting of benzene, toluene, xylene, kerosene, hexane and ligroin.

3. The method according to claim 1, wherein said hydrophobic organic solvents (a) and (b) are one member selected from the group consisting of hexane and ligroin.

4. The method according to claim 1, wherein said fine particles are formed of one member selected from the group consisting of alumina and zinc oxide.

5. The method according to claim 1, wherein said fine particles possess a BET specific surface area in the range of from 5 to 15 m²/g and adsorb water in an amount in the range of 0.1 to 30 mg per m² of surface area.

6. The method according to claim 1, wherein said alcohol is one member selected from the group consisting of ethanol, i-propanol, n-propanol, and n-butanol.

7. The method according to claim 1, wherein the amount of a metal alkoxide dissolved in said hydrophobic organic solvent (b) is in the range of 0.5 to 20 wt % based on the amount of said hydrophobic organic solvent (b).

8. The method according to claim 1, wherein the ratio of the amount of the hydrophobic organic solvent (a) having alcohol dissolved therein to the amount of the hydrophobic organic solvent (b) having the metal alkoxide dissolved therein is in the range of 20:1 to 1:1.

9. The method according to claim 1, wherein said second hydrophobic organic solvent has added thereto 0.005 to 0.05 mol of an amine per liter of said second hydrophobic organic solvent.

10. The method according to claim 9, wherein said amine is at least one member selected from the group consisting of n-hexyl amine, didecyl amine, and tri-n-octyl amine.

11. The method according to claim 7, wherein said metal alkoxide is a member selected from the group consisting of silicon methoxide and silicon ethoxide and is dissolved in said second hydrophobic organic solvent in an amount of from 5 to 20 wt. % based on the amount of said second hydrophobic organic solvent.

12. The method according to claim 7, wherein said metal alkoxide is a member selected from the group consisting of titanium ethoxide, titanium isopropoxide, titanium butoxide and zirconium propoxide and is dissolved in said second hydrophobic organic solvent in an amount ranging from 0.5 to 10 wt. % based on the amount of said second hydrophobic organic solvent.

* * * * *